(12) United States Patent
Marleau et al.

(10) Patent No.: US 9,410,717 B2
(45) Date of Patent: Aug. 9, 2016

(54) POWERED DIAPHRAGM AIR EXTRACTOR AND CONTROL SYSTEM

(75) Inventors: Jim Antime Marleau, Canton, MI (US); Alexander Petniunas, Dearborn, MI (US); Todd William Dishman, West Bloomfield, MI (US); Kenneth Michael Reo, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 827 days.

(21) Appl. No.: 13/271,336

(22) Filed: Oct. 12, 2011

(65) Prior Publication Data

US 2013/0095738 A1   Apr. 18, 2013

(51) Int. Cl.
*B60H 1/00* (2006.01)
*B60H 1/26* (2006.01)
*F24F 13/24* (2006.01)
*B60H 1/24* (2006.01)
*F24F 13/06* (2006.01)

(52) U.S. Cl.
CPC ............... *F24F 13/24* (2013.01); *B60H 1/249* (2013.01); *F24F 13/06* (2013.01)

(58) Field of Classification Search
CPC ............................... B60H 1/248; B60H 1/249
USPC ................................................ 454/141, 162
See application file for complete search history.

(56) References Cited

U.S. PATENT DOCUMENTS

| | | | | |
|---|---|---|---|---|
| 2,224,494 A | * | 12/1940 | White ................... | B60H 1/249 137/527 |
| 2,297,892 A | * | 10/1942 | Jacobs .................. | B60H 1/249 137/529 |
| 2,820,475 A | * | 1/1958 | Hobbs ................... | E06B 5/003 137/357 |
| 3,214,156 A | * | 10/1965 | Jost-Dietlav Klose ................... | A62B 13/00 109/1 S |
| 3,742,976 A | * | 7/1973 | Bailey .................. | F16K 1/46 137/516.11 |
| 3,809,282 A | * | 5/1974 | Blau .................... | B60K 15/0406 220/203.24 |
| 3,952,542 A | * | 4/1976 | Berkowitz ............ | F25D 17/047 137/493.8 |
| 4,257,445 A | * | 3/1981 | Cook .................... | F16K 17/18 137/341 |
| 4,550,470 A | * | 11/1985 | Omata .................. | E05F 3/14 16/85 |
| 4,667,578 A | * | 5/1987 | Hagenah ............... | B60H 1/249 454/164 |
| 5,085,133 A | * | 2/1992 | Hickling ............... | B23K 9/325 454/62 |

(Continued)

FOREIGN PATENT DOCUMENTS

EP    1818198 A1    8/2007
KR   100774417 B1   11/2007

*Primary Examiner* — Steven B McAllister
*Assistant Examiner* — Jonathan Cotov
(74) *Attorney, Agent, or Firm* — LeClairRyan

(57) ABSTRACT

An air extractor assembly for an automotive vehicle includes a diaphragm seat attached to a panel of the vehicle's interior, a diaphragm movable between a closed position and an open position with respect to the diaphragm seat, and a position controller that regulates movement of the diaphragm. The position controller may be any one of a variety of linear movers and may be selected from the group consisting of a solenoid, a motor, a vacuum, and a plunger. The diaphragm includes a resilient member so that when the diaphragm is in its closed position, a tight seal is formed between the diaphragm seat and the diaphragm. The position controller is by any one of a variety of several regulating mechanisms operating alone or in combination. The regulating mechanism may include but is not limited to the vehicle HVAC system, an oxygen sensor, door latches, and a humidity sensor.

15 Claims, 5 Drawing Sheets

(56) References Cited

U.S. PATENT DOCUMENTS

| | | | |
|---|---|---|---|
| 5,105,849 A * | 4/1992 | Clough | B60H 1/249 137/512.15 |
| 5,350,335 A * | 9/1994 | Andersson | B60H 1/00685 454/121 |
| 5,421,775 A * | 6/1995 | Honda | F24F 7/00 454/195 |
| 5,601,117 A * | 2/1997 | Lewis | B60H 1/249 137/527.8 |
| 5,727,999 A * | 3/1998 | Lewis | B60H 1/249 137/527.8 |
| 6,016,802 A * | 1/2000 | Jackson | A62B 9/02 128/201.19 |
| 6,068,551 A * | 5/2000 | Oremland | B60H 1/248 454/162 |
| 6,210,266 B1 * | 4/2001 | Barton | B29C 45/1676 137/855 |
| 7,503,843 B1 * | 3/2009 | Wilmoth | B60H 1/249 454/162 |
| 7,556,559 B2 * | 7/2009 | Rivera | B60H 1/249 137/855 |
| 7,974,755 B2 * | 7/2011 | Campbell | B60R 16/0232 701/1 |
| 8,099,916 B2 * | 1/2012 | Joasil | E06B 3/677 454/122 |
| 8,360,104 B2 * | 1/2013 | Shereyk | B60H 1/249 137/852 |
| 8,414,366 B2 * | 4/2013 | Browne | F16K 17/003 454/162 |
| 2006/0199267 A1 * | 9/2006 | Savur | A23B 7/148 436/55 |
| 2008/0113600 A1 * | 5/2008 | Kim | B60R 13/0815 454/105 |
| 2008/0314037 A1 * | 12/2008 | Neels | B01D 53/9431 60/324 |
| 2009/0088062 A1 * | 4/2009 | Major | B60H 1/00278 454/70 |
| 2009/0088065 A1 * | 4/2009 | Mouch | B60H 1/248 454/164 |
| 2009/0098819 A1 * | 4/2009 | Lambrecht | F24F 13/18 454/333 |
| 2010/0291854 A1 * | 11/2010 | Carlson | B60H 1/249 454/162 |
| 2010/0317276 A1 * | 12/2010 | Bracker | F16K 17/06 454/74 |
| 2012/0003907 A1 * | 1/2012 | Carlson | B60H 1/00735 454/70 |

* cited by examiner

POWERED DIAPHRAGM AIR EXTRACTOR AND CONTROL SYSTEM

TECHNICAL FIELD

The disclosed invention relates generally to air pressure equalization mechanisms for vehicles. More particularly, the disclosed invention relates to a powered diaphragm air extractor positionable between a fully open position, a fully closed position, or any partially open-partially closed position therebetween.

BACKGROUND OF THE INVENTION

The typical modern automotive vehicle includes a mechanism for equalizing the pressure between the interior compartment of the automobile and the outside atmosphere. The interior or passenger compartment of the vehicle is effectively sealed from the outside atmosphere, thus providing good heating and air conditioning within. Under certain operating circumstances, air pressure in the passenger compartment may exceed ambient atmospheric pressure. This condition typically arises when a door is closed when an occupant enters or exits the vehicle. If the interior is not vented to the atmosphere to equalize pressure, it is likely that the effort required to close the door will increase. Under this circumstance, the occupant will need to exert greater effort to move the door.

Efforts have been made to overcome this problem and have been employed in the construction of vehicles. A common solution has been the provision of an air extractor as a pressure responsive device interposed between the passenger compartment and the exterior of the vehicle. An air extractor is a one-way valve that allows air to move from the inside of the vehicle to the outside without letting in the outside air.

An example of a known air extractor is shown in FIG. 1. With reference to that figure, a conventional air extractor, generally illustrated as 10, is shown. The air extractor 10 includes a body 12 having air passages 14, 14' and 14" formed therein. Over each air passage is provided a pivotable flap. Accordingly, a flap 16 is hingedly attached to the body 12 over the air passage 14, a flap 16' is provided over the air passage 14', and a flap 16" is provided over the passage 14". Variations of this arrangement are known but the air extractor 10 shown in FIG. 1 is exemplary.

While providing advantages to vehicle design and operation there are several drawbacks to known air extractor designs. First, the flaps of the typical air extractor are controlled by gravity and are thus are limited in their installed orientation to a vertical orientation. The flaps of the typical air extractor are also controlled by air flow. Therefore, the flaps do not stay closed when they should due to many circumstances, including the position of the vehicle on the underlying surface, the motion of the vehicle and the vibration of the vehicle. It is not possible to control gravity or air flow without physical shape modifications.

Second, air flow rate of the known air extractor is related directly to flap design, sizing and area. According to current designs not one of these variables is controlled.

Third, the flaps make noises that may be audible to the vehicle occupants when they open or close.

The fourth drawback is also related to noise. As known air extractor designs represent a compromise between the need to exhaust air out of a vehicle and the desire to limit the amount of noise in the vehicle, the result is that the size of the air extractor is reduced to a minimum thus keeping the noise entering the vehicle to a minimum. On the one hand, noise is reduced but, on the other hand, air flow is also necessarily reduced.

Fifth, the body and flap construction of known air extractors requires several independently moving parts and is thus complex and expensive.

Accordingly, as in so many areas of vehicle technology, there is room in the art of air extractor technology for an alternative configuration that provides maximum effective air flow with minimal vehicle noise and operating parts.

SUMMARY OF THE INVENTION

The disclosed invention provides a powered air extractor assembly for an automotive vehicle. The air extractor assembly comprises a diaphragm seat attached to body a panel of the vehicle's interior, the body panel separating the interior compartment from the outer atmosphere. The air extractor assembly further includes a diaphragm that is movable between a closed position and an open position with respect to the diaphragm seat. The diaphragm includes a resilient member so that when the diaphragm is in its closed position a tight seal is formed between the diaphragm seat and the diaphragm.

A position controller regulates movement of the diaphragm. The position controller may be selected from a variety of linear movers, including, but not limited to, a solenoid, a motor, a vacuum, a plunger, or any other mechanism capable of causing linear movement. A regulator receives information from various vehicle sensors including, but not limited to, an HVAC sensor, an oxygen sensor, one or more door latch sensors, a humidity sensor, or an air pressure sensor. The regulator then regulates the position controller in response to the status of the HVAC system, the status of the door latches, the humidity level, the level of oxygen, or the air pressure of the vehicle interior compared with the atmosphere.

The diaphragm seat has an inner surface and an outer surface. The diaphragm may rest against either the inner surface or the outer surface when closed depending on the embodiment.

Depending on the status of the HVAC system, the status of the door latches, the humidity level, the level of oxygen, or the air pressure of the vehicle interior compared with the atmosphere as sensed by the sensors, the diaphragm is moved to its open or closed position. The position controller may fine tune the position of the diaphragm relative to the diaphragm seat to regulate the amount of air flow.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 5 illustrates a perspective side view of the embodiment of the powered air extractor of FIG. 4;

DETAILED DESCRIPTION OF THE PREFERRED EMBODIMENT

Figure 1:
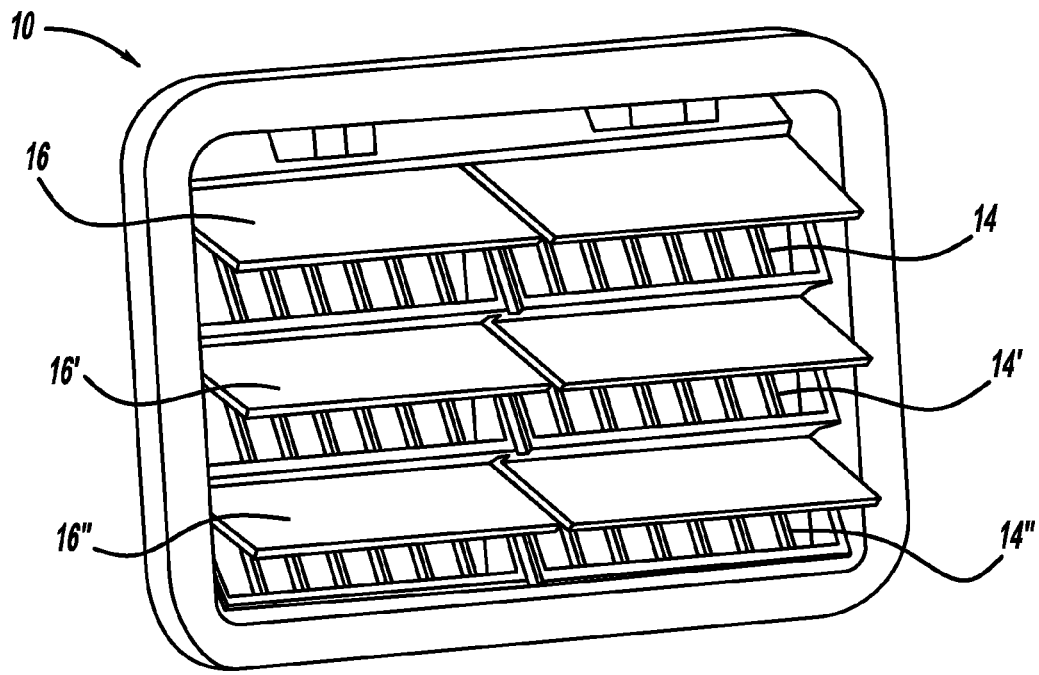
FIG. 1 illustrates a front perspective view of an air extractor according to the prior art.

In the following figures, the same reference numerals will be used to refer to the same components. In the following description, various operating parameters and components are described for different constructed embodiments. These specific parameters and components are included as examples and are not meant to be limiting.

Figure 2:
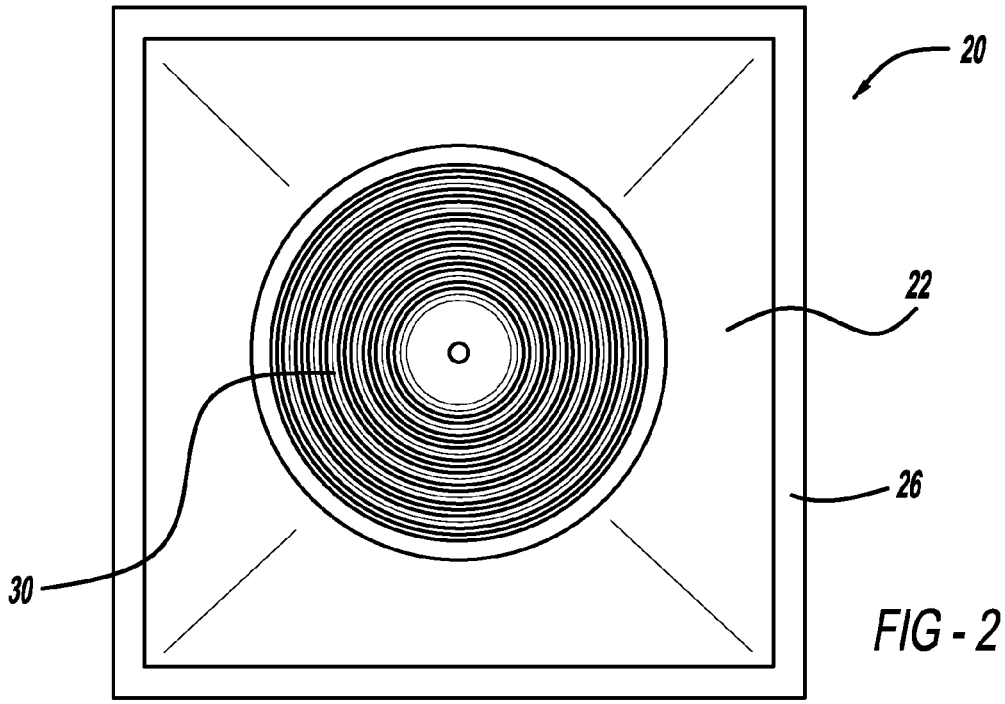
FIG. 2 illustrates a front view of a powered air extractor according to an embodiment of the disclosed invention.
Figure 3:
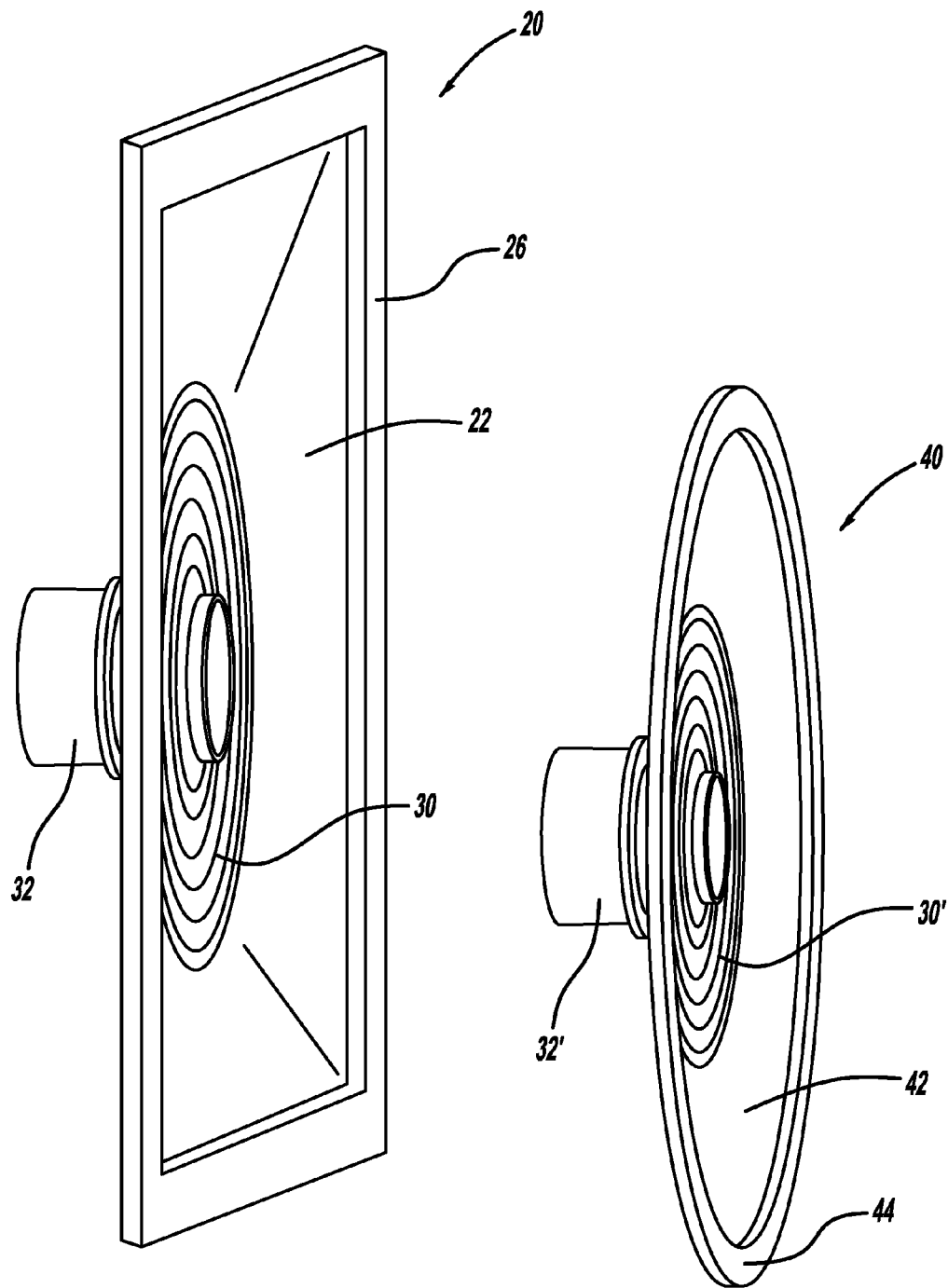
FIG. 3 illustrates a perspective side view of the embodiment of the powered air extractor of FIG. 2.

Referring to FIGS. 2 and 3, one embodiment of a powered air extractor, generally illustrated as 20, is shown. The powered air extractor 20 may be activated (opened or moved) depending on the HVAC fan speed or system mode.

The powered air extractor 20 includes a diaphragm 22 that is square in shape. The diaphragm 22 may be composed of a variety of flexible yet durable and moisture-resistant materials such as a plastic. A peripheral seal 26 is formed at the outermost edge of the diaphragm 22. Centrally located on the diaphragm 22 is a resilient portion 30. A guide pin 31 is fitted to a fixed part of the powered air extractor of the disclosed invention to prevent rotation of the diaphragm as it moves from its open position to its closed position. While one guide pin 31 is illustrated more than one guide pin may be included.

Figure 4:
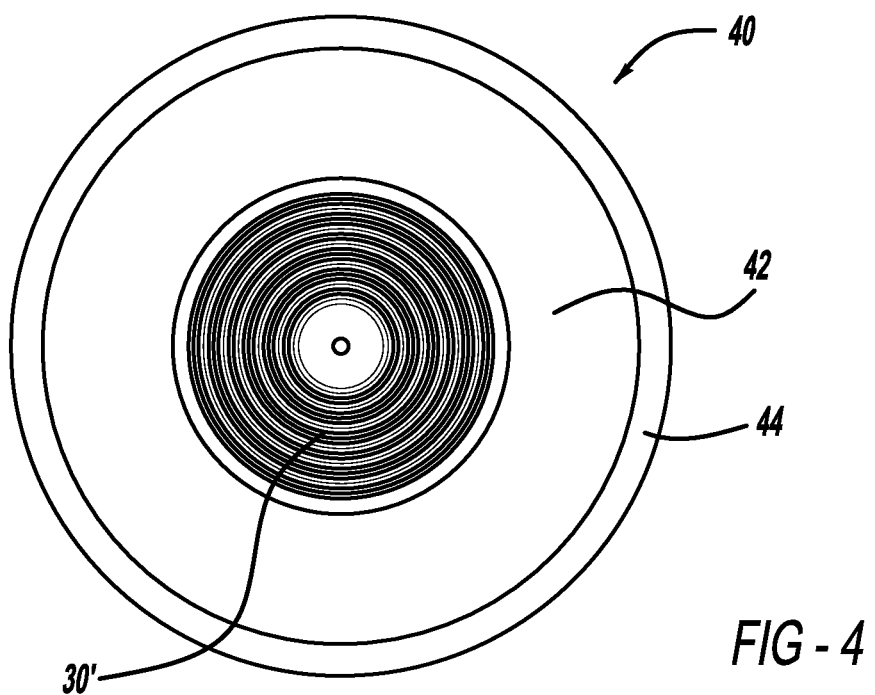
FIG. 4 illustrates a front view of a powered air extractor according to another embodiment of the disclosed invention.

It is to be noted that the illustrated square shape of the diaphragm 22 is provided for suggestive purposes only and is not intended to be limiting as other shapes, such as rectangular, oval or round, may be used as well. One such shape, a round shape, is shown in FIGS. 4 and 5 where another embodiment of a powered air extractor, generally illustrated as 40, is shown. The powered air extractor 40 includes a diaphragm 42 that is round in shape. As is the case with the diaphragm 22 mentioned above, the diaphragm 42 may be composed of a variety of flexible yet durable and moisture-resistant materials such as plastic. A peripheral seal 44 is formed at the outermost edge of the diaphragm 42.

Figure 6A:
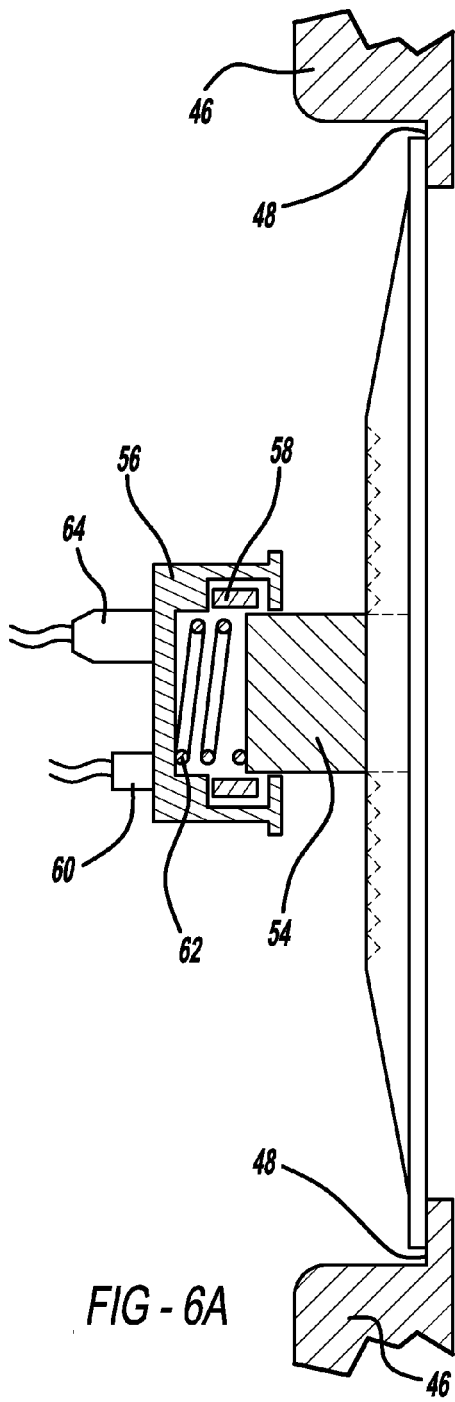
FIG. 6A illustrates a sectional side view of the powered air extractor according to a first configuration of the placement of the air extractor of the disclosed invention relative to the diaphragm seat with the air extractor being shown in its closed position.
Figure 6B:
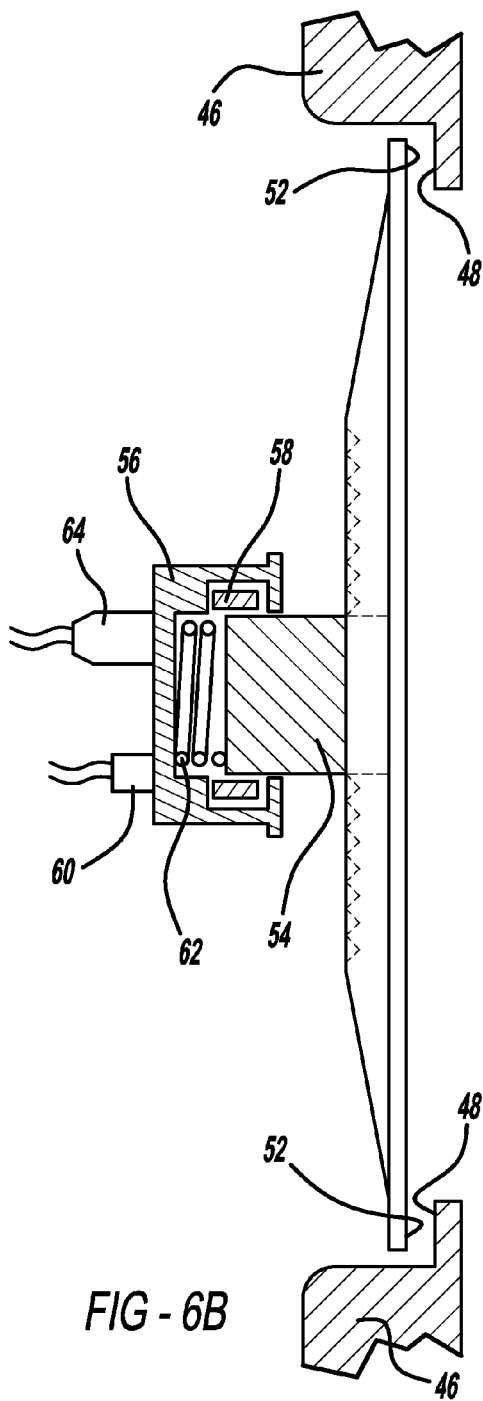
FIG. 6B illustrates the air extractor of FIG. 6A shown in its open position.

FIGS. 6A and 6B illustrate the diaphragm 22 (or 42) in its closed and open positions respectively. A diaphragm of any shape (beyond those shown) may be used for the purpose described in the disclosed invention.

As illustrated in FIGS. 6A and 6B, a diaphragm seat 46 is attached to a panel (not shown) defining a wall between the vehicle's interior compartment and the outside atmosphere. The peripheral seal 26 (of the diaphragm 22) or the peripheral seal 44 (of the diaphragm 42) seats against diaphragm seat 46 when the diaphragm is in its closed position. The diaphragm seat 46 includes a diaphragm seat surface 48.

Centrally located on the diaphragm 42 is a resilient portion 30'. The resilient portion 30 and the resilient portion 30' are provided to assure a tight seal between the peripheral seal 26 of the diaphragm 22 and the peripheral seal 44 of the diaphragm 42 and the diaphragm seat surface 48 of the diaphragm seat 46. The resilient portion 46 may include, for example, an embedded resilient metal spring.

The diaphragm 22 is operated by a position controller 32 to control the position of the diaphragm 22 relative to the diaphragm seat 46 and the diaphragm 42 is operated by a position controller 32' to control the position of the diaphragm 42 relative to the diaphragm seat 46. The position controllers 32 and 32' may be selected from a variety of linear movers, including, but not limited to, a solenoid, a motor, a vacuum, a plunger, or any other mechanism capable of causing linear movement.

Figures 7A, 7B:
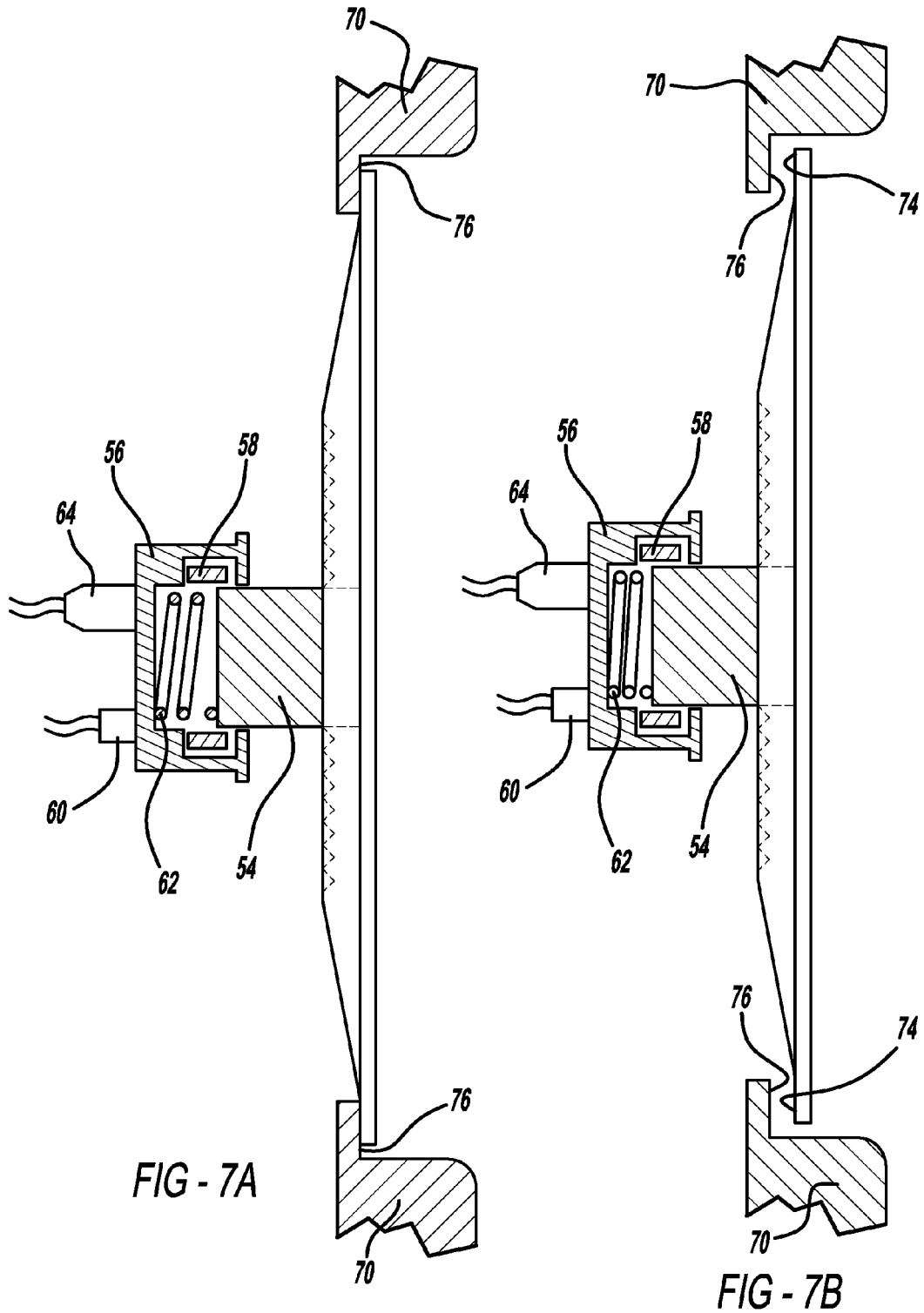
FIG. 7A illustrates a sectional side view of the powered air extractor according to a second configuration of the placement of the air extractor of the disclosed invention relative to the diaphragm seat with the air extractor being shown in its closed position.
FIG. 7B illustrates the air extractor of FIG. 7A shown in its open position.

As noted above, FIGS. 6A and 6B illustrate the diaphragm 22 (or 42) in its closed and open positions respectively relative to the diaphragm seat 46. An alternative embodiment of the closed and open positions relative to a seat is illustrated in FIGS. 7A and 7B and will be discussed in conjunction therewith. For the sake of clarity and simplicity only one diaphragm, diaphragm 22, will be discussed in conjunction with FIGS. 6A, 6B, 7A and 7B although it is to be understood that the diaphragm 42 is as suitable for the disclosed purpose and would function in a like manner.

While, as set forth above, the position controller 32 may be selected from a variety of linear movers. A solenoid is illustrated in the figures as one possible type of controller. The solenoid is shown for illustrative purposes only and its use is not intended as being limiting. Accordingly, the solenoid position controller 32 includes a central plunger 54 reciprocatingly fitted within a housing 56. Fixed within the housing 56 are coil windings 58. Lead wires 60 are associated with the coil windings 58 and may provide electrical energy thereto when desired.

A spring 62 is fitted between the end wall of the housing 56 and the end surface of the central plunger 54. The spring 62 urges the central plunger 54 to extend out of the housing 56 when no power is applied to the coil windings 58 via the lead wires 60.

A regulator 64 is operatively associated with the position controller 32 and with a sensor 66. The sensor 66 may comprise one or more sensors selected from the group consisting of an HVAC sensor, an oxygen sensor, one or more door latch sensors, a humidity sensor, or an air pressure sensor. In response to the status of the HVAC system, the status of the door latches, the humidity level, the level of oxygen, or the air pressure, the sensor 66 signals the regulator 64 which in turn regulates the position controller 32. Multiple sensors 66 may be fitted.

In operation, ordinarily the diaphragm 22 is in its closed position as illustrated in FIG. 6A. When a person enters or exits the vehicle the unlatching of the door is sensed by the door latch sensor the information is communicated to the regulator 64 which causes the position controller 32 to move the diaphragm 22 to its full open position as illustrated in FIG. 6B. The diaphragm 22 is held in this full open position for a predetermined period of time (for example, for 0.25 second) until after the door latch is in its closed position.

In addition or as an alternative, the diaphragm 22 may be held in its closed position until fresh air is needed. The determination as to whether or not one or more conditions (such as the status of the HVAC system, the status of the door latches, the oxygen level, air pressure, or humidity) is such that the diaphragm 22 should be opened and thus the input of fresh air is made by the regulator 64. Movement of the diaphragm 22 is made accordingly. This arrangement greatly improves NVH performance over a typical air extractor.

As an alternate embodiment of the disclosed invention, and with reference to FIGS. 7A and 7B, a diaphragm seat 70 is attached to a panel (not shown) between the vehicle's interior compartment and the outside atmosphere. According to this arrangement, the peripheral seal of the diaphragm is located on the back side (the vehicle inward side) of the diaphragm. As illustrated in FIGS. 7A and 7B, a peripheral seal 74 is fitted to the back side of the diaphragm. The diaphragm seat 70 includes a diaphragm seat surface 76. In all other ways operation of the embodiment of the air extractor shown in FIGS. 7A and 7B is the same as that discussed above with respect to FIGS. 6A and 6B.

The disclosed powered air extractor solves several of the common air extractor design shortfalls. First, due to the powered diaphragm, spring and linear movement arrangement a constant force can be applied thus keeping the air extractor fully closed when such closure is desired. Second, the control system allows the closing velocity to be infinitely controlled. By slowing down the velocity of the diaphragm as the desired position is reached, the unwanted opening or closing noise can be eliminated. Third, the diaphragm control system allows for all aspects of position or velocity to be defined or changed to match operational profiles. Fourth, the flow rate is fully controllable due to infinite positioning and velocity control without regard to installed orientation, vibration, motion, or cabin air pressure. Fifth, by reducing the number and magnitude of the common air extractor error states the size of the air extractor can be increased while still maintaining current NVH targets. In this way the NVH performance is increased without reducing the maximum air flow characteristics. Sixth, and unlike known systems, the disclosed powered air extractor does not rely on gravity for movement and can thus be placed in virtually any orientation, including horizontally, thus making its placement virtually unlimited. The powered air extractor of the disclosed invention may thus be placed on the firewall, on the deck between the vehicle interior and the trunk, and in any door including, for example, the vehicle's lift gate if so fitted. And seventh, the disclosed powered air extractor can be used alone or in combination with known systems without compromising its effectiveness.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An air extractor assembly for an automotive vehicle, the vehicle having an interior compartment and a body panel separating the interior compartment from the outer atmosphere, the air extractor assembly comprising:
    a diaphragm seat attached to the body panel:
    a flexible, moisture-resistant diaphragm movable between a closed position and an open position with respect to said diaphragm seat, said diaphragm having a center;
    a resilient circular portion centrally formed on said diaphragm, said portion having a center, said center of said diaphragm and said center of said portion maintaining annular alignment; and
    a linear mover to which said diaphragm is attached for controlling movement of said diaphragm, said mover extending from said center of said resilient portion.

2. The air extractor assembly of claim 1, wherein the diaphragm is spaced a distance apart from the diaphragm seat in the open position, and wherein the regulator controls the operation of the linear mover by causing the diaphragm to move a second distance from the diaphragm seat, the second distance being shorter than the distance in order to reduce an amount of air flow through the air extractor assembly.

3. The air extractor of claim 1 further comprising, a sensor that communicates with the regulator and that includes at least one of an HVAC system sensor, an oxygen sensor, a door latch sensor, a humidity sensor, or an air pressure sensor.

4. The air extractor assembly of claim 1 wherein said diaphragm seat includes an inside surface and an outside surface.

5. The air extractor assembly of claim 4 wherein said inside surface has a diaphragm-contacting surface formed thereon.

6. The air extractor assembly of claim 4 wherein said outside surface has a diaphragm-contacting surface formed thereon.

7. The air extractor assembly of claim 1 wherein said diaphragm is disc-shaped.

8. The air extractor assembly of claim 1 wherein said linear mover is selected from the group consisting of a solenoid, a motor, a vacuum, and a plunger.

9. An air extractor assembly for an automotive vehicle, the vehicle having an interior compartment and a body panel separating the interior compartment from the outer atmosphere, the air extractor assembly comprising:
    a diaphragm seat attached to the body panel:
    a flexible, moisture-resistant diaphragm movable between a closed position and an open position with respect to said diaphragm seat, said diaphragm having a center:
    a resilient circular portion centrally formed on said diaphragm, said portion having a center, said center of said diaphragm and said center of said portion maintaining annular alignment; and
    a position controller to which said diaphragm is attached for controlling movement of said diaphragm; and
    a door-latch sensor that sends a notification indicating that a door has been unlatched, wherein the position controller causes the diaphragm to move to the open position when the notification is received.

10. The air extractor assembly of claim 9 wherein said position controller is selected from the group consisting of a solenoid, a motor, a vacuum, and a plunger.

11. The air extractor assembly of claim 9 further including a regulator operatively associated with said position controller, wherein the regulator receives the notification from the door-latch sensor and initiates an operation by the position controller.

12. The air extractor assembly of claim 9 wherein said diaphragm seat includes an inside surface and an outside surface.

13. The air extractor assembly of claim 12 wherein said inside surface has a diaphragm-contacting surface formed thereon.

14. The air extractor assembly of claim 12, wherein said outside surface has a diaphragm-contacting surface formed thereon.

15. The air extractor assembly of claim 9 wherein said diaphragm is disc-shaped.

* * * * *